United States Patent
Sikora

(10) Patent No.: US 8,282,242 B1
(45) Date of Patent: *Oct. 9, 2012

(54) LED LIGHT ASSEMBLY AND RELATED METHODS

(75) Inventor: Scott T. Sikora, Gilbert, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,609

(22) Filed: Jan. 10, 2012

Related U.S. Application Data

(63) Continuation of application No. 12/276,090, filed on Nov. 21, 2008, now Pat. No. 8,092,044.

(51) Int. Cl.
*F21S 4/00* (2006.01)
(52) U.S. Cl. .............. 362/249.02; 362/249.01; 362/294; 362/373; 362/311.02
(58) Field of Classification Search ............ 362/249.01, 362/249.02, 294, 373
See application file for complete search history.

(56) References Cited

U.S. PATENT DOCUMENTS

| | | | |
|---|---|---|---|
| 5,855,707 A | 1/1999 | Luettgen | |
| 6,413,800 B1 | 7/2002 | Kyle | |
| 6,572,004 B2 | 6/2003 | Siu | |
| 6,600,266 B1 | 7/2003 | Nakagawa | |
| 6,921,297 B2 | 7/2005 | Quadir et al. | |
| 6,966,957 B2 | 11/2005 | Tsuchihashi | |
| 6,976,770 B2 | 12/2005 | Trimpe et al. | |
| 6,992,844 B2 | 1/2006 | Pollock et al. | |
| 7,217,005 B2 | 5/2007 | Lin | |
| 7,255,460 B2 | 8/2007 | Lee | |
| 7,348,203 B2 | 3/2008 | Kaushal et al. | |
| 8,092,044 B1 * | 1/2012 | Sikora | 362/249.02 |
| 2008/0074871 A1 * | 3/2008 | Meis et al. | 362/218 |

* cited by examiner

*Primary Examiner* — Stephen F Husar
*Assistant Examiner* — James Cranson, Jr.
(74) *Attorney, Agent, or Firm* — Booth Udall, PLC

(57) ABSTRACT

A light emitting diode (LED) assembly. Implementations of an LED light assembly may include a base having a circuit including a one or more LEDs, a thermally conductive polymer support coupled to the circuit, and a non-thermally conductive polymer member coupled to the thermally conductive polymer support. A non-thermally conductive polymer lens cover may be coupled to the non-thermally conductive polymer member. The non-thermally conductive polymer lens cover may be configured to enclose the circuit of the base when coupled to the non-thermally conductive polymer member.

19 Claims, 3 Drawing Sheets

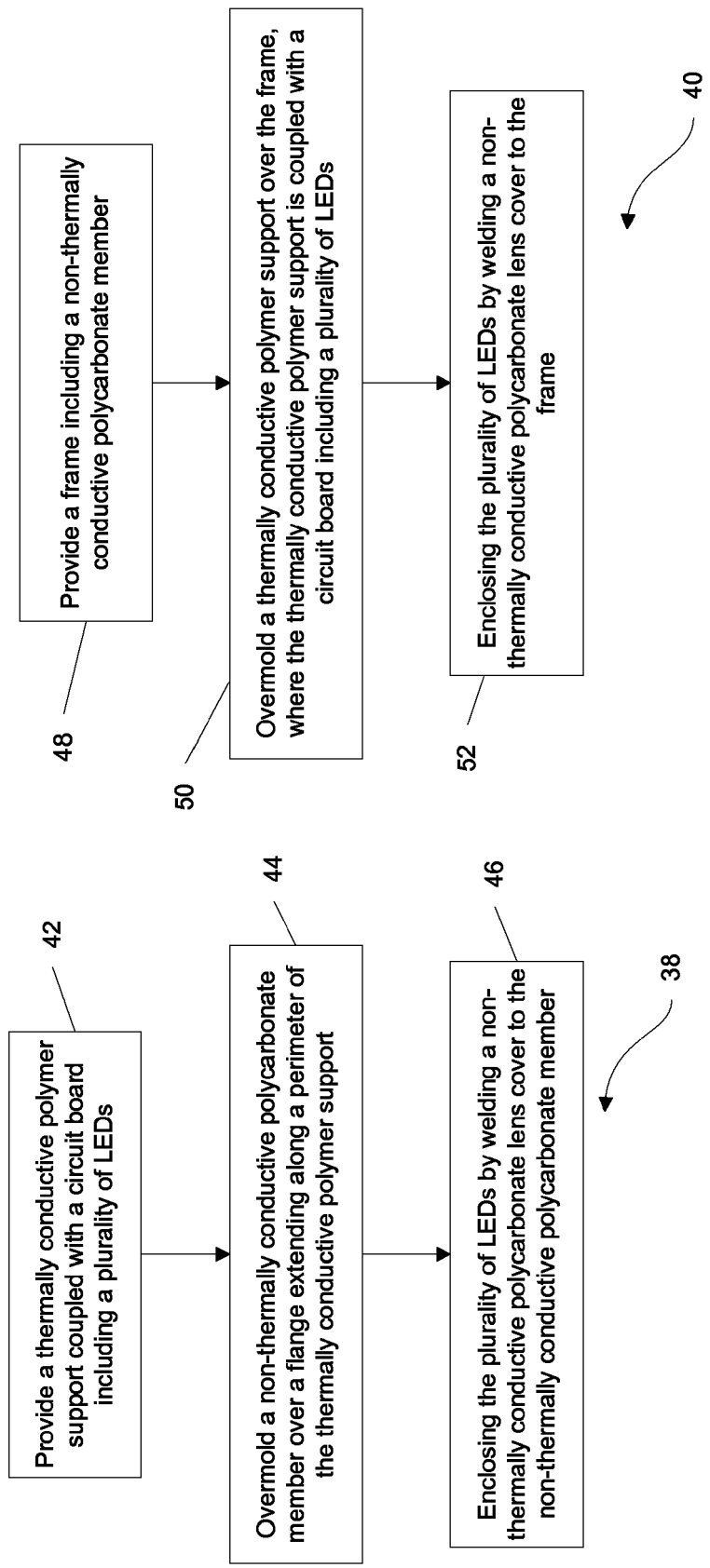

LED LIGHT ASSEMBLY AND RELATED METHODS

CROSS REFERENCE TO RELATED APPLICATIONS

This application is a continuation application of the earlier U.S. patent application Ser. No. 12/276,090 to Sikora entitled "LED Light Assembly and Related Methods" and filed Nov. 21, 2008, the disclosure of which is hereby incorporated herein by reference.

BACKGROUND

1. Technical Field

Aspects of this document relate generally to structures and methods for forming a light emitting diode ("LED") light assembly through coupling dissimilar materials.

2. Background Art

The construction of conventional LED light assemblies requires the consideration of several factors. Conventional LEDs, while emitting significant light, also create heat that must be removed to prevent damage or premature failure. Often, conventional LED light assemblies include a heat sink or convection system to remove heat. Many conventional LED light assemblies also include an enclosure through which the light emitted by the LEDs passes.

SUMMARY

Implementations of an LED light assembly may include a base having a circuit including a plurality of light emitting diodes ("LEDs"), a thermally conductive polymer support coupled to the circuit, and a non-thermally conductive polymer member coupled to the thermally conductive polymer support. A non-thermally conductive polymer lens cover may be coupled to the non-thermally conductive polymer member. The non-thermally conductive polymer lens cover may be configured to enclose the circuit of the base when coupled to the non-thermally conductive polymer member.

Implementations of LED light assemblies may include one, all, or any of the following:

The non-thermally conductive polymer member may be overmolded over a flange extending from a perimeter of the thermally conductive polymer support.

The thermally conductive polymer support may be overmolded over a frame formed of the non-thermally conductive polymer member.

The frame may include one or more mating features corresponding to one or more mating features included in the non-thermally conductive polymer lens cover.

The non-thermally conductive polymer member and the non-thermally conductive polymer lens cover are joined by one of linear vibration welding, sonic welding, acoustic welding, and thermal welding.

When the non-thermally conductive polymer lens cover is coupled over the base, the circuit may be hermetically sealed within an enclosure.

The thermally conductive polymer support may have a bulk thermal conductivity about five times higher than a bulk thermal conductivity of the non-thermally conductive polymer member.

The bulk thermal conductivity of the non-thermally conductive polymer member may be about 0.2 watt/mK or lower and the bulk thermal conductivity of the thermally conductive polymer support may be about 1 watt/mK or higher.

Implementations of LED light assemblies may utilize implementations of a first method of forming an LED light assembly. The method may include providing a thermally conductive polymer support coupled with a circuit having a one or more LEDs, overmolding a non-thermally conductive polymer member over a flange extending along a perimeter of the thermally conductive polymer support, and enclosing the one or more LEDs by welding a non-thermally conductive polymer lens cover to the non-thermally conductive polymer member.

First implementations of a method of forming an LED light assembly may include one, all, or any of the following:

Enclosing the one or more LEDs by welding the non-thermally conductive polymer lens cover may form a hermetically sealed enclosure around the one or more LEDs.

Enclosing the one or more LEDs by welding the non-thermally conductive polymer lens cover may include using one of linear vibration welding, sonic welding, acoustic welding, and thermal welding.

The thermally conductive polymer support may have a bulk thermal conductivity about five times higher than a bulk thermal conductivity of the non-thermally conductive polymer member.

The bulk thermal conductivity of the non-thermally conductive polymer member may be about 0.2 watt/mK or lower and the bulk thermal conductivity of the thermally conductive polymer support may be about 1 watt/mK or higher.

Implementations of LED light assemblies may utilize second implementations of a method of forming an LED light assembly. The method may include providing a frame including a non-thermally conductive polymer member and overmolding a thermally conductive polymer support over the frame. The thermally conductive polymer support may be coupled with a circuit having a one or more LEDs. The method may also include enclosing the one or more LEDs by welding a non-thermally conductive polymer lens cover to the frame.

Implementations of a second method of forming an LED light assembly may include one, all, or any of the following:

Enclosing the one or more LEDs by welding the non-thermally conductive polymer lens cover may form a hermetic seal around the one or more LEDs.

Enclosing the one or more LEDs by welding the non-thermally conductive polymer lens cover may further include using one of linear vibration welding, sonic welding, acoustic welding, and thermal welding.

Enclosing the one or more LEDs by welding the non-thermally conductive polymer lens cover may include welding one or more mating features included on the frame to one or more mating features included on the non-thermally conductive polymer lens cover.

The thermally conductive polymer support may have a bulk thermal conductivity about five times higher than a bulk thermal conductivity of the non-thermally conductive polymer member.

The bulk thermal conductivity of the non-thermally conductive polymer member may be about 0.2 watt/mK or lower and the bulk thermal conductivity of the thermally conductive polymer support may be about 1 watt/mK or higher.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3A is a flow diagram of an implementation of a first method of forming an LED light assembly;

FIG. 3B is a flow diagram of another implementation of a second method of forming an LED light assembly.

DESCRIPTION

This disclosure, its aspects and implementations, are not limited to the specific components or assembly procedures disclosed herein. Many additional components and assembly procedures known in the art consistent with the intended light emitting diode (LED) light assemblies and/or assembly procedures for an LED light assembly will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such LED light assemblies and implementing components, consistent with the intended operation.

Figure 1A:
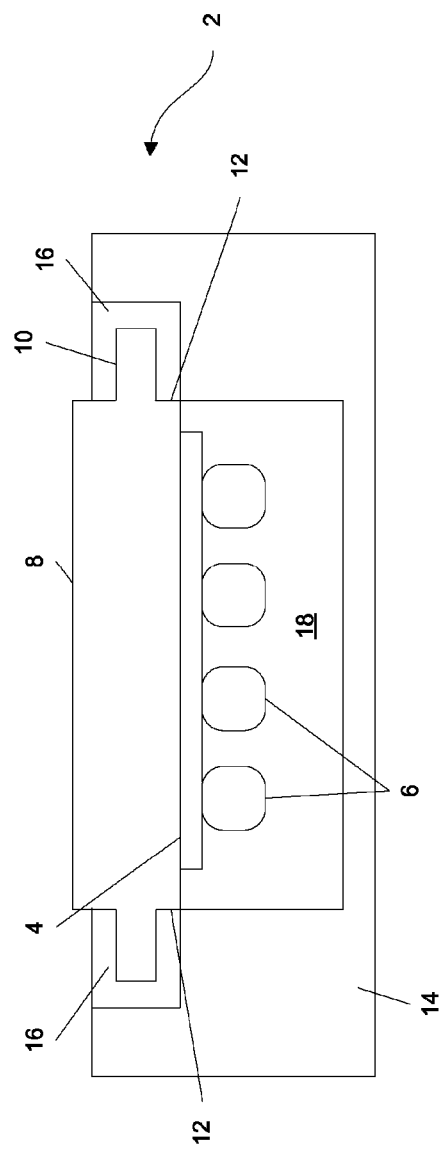
FIG. 1A is a cross sectional view of a first implementation of an LED light assembly.

Referring to FIG. 1A, a cross sectional view of a first implementation of an LED light assembly 2 is illustrated. As illustrated, the LED light assembly 2 includes a circuit 4 with a one or more LEDs 6 coupled with a thermally conductive polymer support 8. The combination of the circuit 4, the one or more LEDs 6, and the thermally conductive polymer support 8 may be called a base in particular implementations. Because during operation of the LED light assembly 2 the one or more LEDs 6 may release a significant amount of heat, the one or more LEDs 6 and the circuit 4 need both physical support and a heat sink capable of removing the generated heat. In particular implementations, the circuit 4 may be imprinted or embedded in the thermally conductive polymer support 8. In other implementations, the circuit 4 may be incorporated onto or as part of a circuit board that is coupled with the thermally conductive polymer support 8. The thermally conductive polymer support 8 may perform both a support and heat transfer function. Examples of thermally conductive polymers that may be included in implementations of thermally conductive polymer supports 8 include the E-series and D-series of polymers marketed under the CoolPoly® trademark available from Cool Polymers, Inc. of Warwick, R.I., U.S.A. The thermally conductive polymer support 8 includes a flange 10 that extends around the perimeter 12 of the of the support 8. In particular implementations, the flange 10 may extend along a portion of the perimeter 12; in other implementations, the flange 10 may extend along the entire perimeter 12.

As illustrated, a non-thermally conductive polymer lens cover 14 is coupled with the thermally conductive polymer support 8 through a non-thermally conductive polymer member 16 that is overmolded over the flange 10 of the thermally conductive polymer support 8. Examples of non-thermally conductive polymers that may be used in implementations of LED light assemblies described in this document may include polycarbonates marketed under the trademark Lexan® by SABIC Innovative Plastics Holding, BV of Pittsfield, Mass., U.S.A., any other type of polycarbonate polymer material, a polymethylmethacrylate polymer material, an acrylic polymer material, a bio-plastic material, or any other type of polymeric material exhibiting non-thermally conductive behavior . . . . As used in this document, non-thermally conductive does not mean that a material does not conduct any heat; rather it is used to indicate that a material conducts significantly less heat than another material with which it is being compared. In this document, non-thermally conductive polymer materials may have bulk thermal conductivities in ranges of about 1 watt/mK or higher while thermally conductive polymer materials may have bulk thermal conductivities in ranges of about 0.2 watt/mK or lower. In particular implementations, the thermally conductive polymer materials may have a bulk thermal conductivity about five times higher than the bulk thermal conductivity of a non-thermally conductive polymer material. For the exemplary purposes of this disclosure, the thermal conductivity of the polymer material forming the thermally conductive polymer support 8 may be about 10 watts/mK while the thermal conductivity of the non-thermally conductive polycarbonate material (SABIC Lexan® brand) may be about 0.2 watts/mK.

Because the thermally conductive polymer support 8 conducts heat relatively easily, it may be difficult to couple it directly to the non-thermally conductive polymer lens cover 14 through any method, such as welding, that involves heating the two materials above a particular temperature to form a bond. In addition, significant mechanical stresses may exist during operation of the one or more LEDs 6 because of the difference in values of the thermal expansion coefficients of the thermally conductive polymer support 8 and the non-thermally conductive polymer lens cover 14. Accordingly, because the non-thermally conductive polymer lens cover 14 is coupled to the thermally conductive polymer support 8 through an overmolded non-thermally conductive polymer member 16, the lens cover 14 and member 16, made of materials with relatively similar thermal properties, may be able to be coupled using a wide variety of thermal techniques, including, by non-limiting example, welding, sonic welding, acoustic welding, thermal welding, linear vibration welding, and any other thermal coupling method or system.

As illustrated in FIG. 1A, when the non-thermally conductive polymer lens cover 14 is coupled over the one or more LEDs 6 via the non-thermally conductive polymer member 16, the one or more LEDs extend into an enclosure 18 formed by the lens cover 14. Because the non-thermally conductive polymer lens cover 14 is generally formed of transparent or semi-transparent materials, the light from the one or more LEDs is visible through the lens cover 14 during operation of the LEDs. In addition, in particular implementations of LED light assemblies 2, when the non-thermally conductive polymer lens cover 14 is coupled to the non-thermally conductive polymer member 16 via welding, the enclosure 18 may exhibit hermetic properties, i.e., little or no transfer of air, water, or other gases or liquids may be permitted into or out of the enclosure 18. In addition, because the non-thermally conductive polymer lens cover 14 and the non-thermally conductive polymer member 16 may be constructed of relatively similar materials, during operation of the one or more LEDs 6, relatively little thermal mechanical stress may be experienced at the joint between the two pieces, and improved reliability and robustness of the joint may be observed.

Figure 1B:
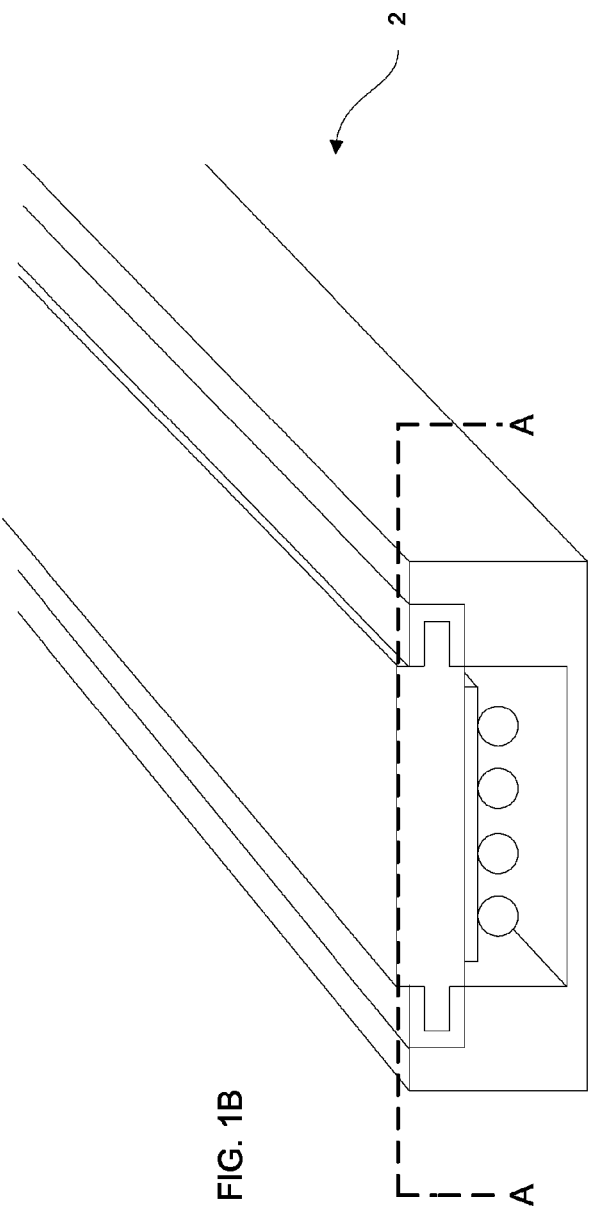
FIG. 1B is a perspective view of the implementation of an LED light assembly illustrated in FIG. 1A showing the location of the cross section illustrated in FIG. 1A along sectional line A.

Referring to FIG. 1B, a perspective view of the implementation of an LED light assembly 2 illustrated in FIG. 1A is illustrated, showing the location of the cross section along Sectional line A. As illustrated, the LED light assembly 2 may extend for some distance to form a light bar or other device for use as a light source on a vehicle or other object, and may be installed with the thermally conductive polymer support 8 coupled to the mounting surface which may act as a heat sink in particular implementations. In others, the thermally conductive polymer support 8 may be exposed to ambient air or a forced convection source which serves to transfer the heat from the support 8 to the cooling gas or fluid. For the exemplary purposes of this disclosure, implementations of LED light assemblies 2 utilized as light bars on vehicles, such as emergency vehicles, may be between about 2 feet to about 8 feet in length and may include end caps or other structures at the bar ends that include mechanical, electrical, or other connections. For police vehicles, the light bar may be between about 40 inches to about 50 inches in length.

Figure 2A:
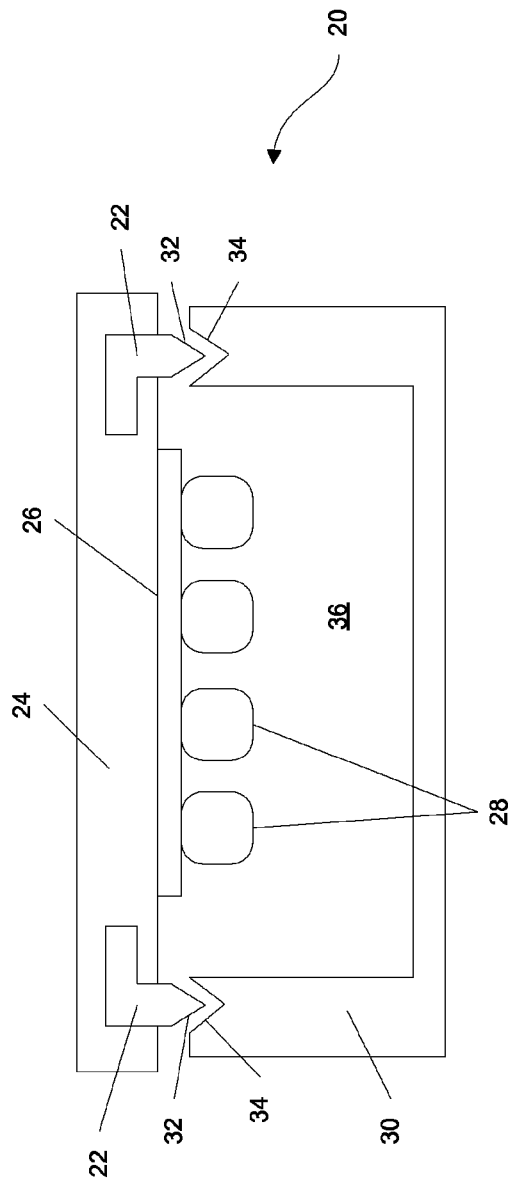
FIG. 2A is a is a cross sectional view of a second implementation of an LED light assembly.

Referring to FIG. 2A, a cross section view of a second implementation of a LED light assembly 20 is illustrated. As illustrated, the LED light assembly 20 includes a frame 22 including a non-thermally conductive polymer member coupled with a thermally conductive polymer support 24. In the implementation illustrated in FIG. 2A, the coupling has taken place by overmolding the thermally conductive polymer support 24 over the frame 22. In these implementations, the process of overmolding may also be referred to as insert molding or embedded molding. The thermally conductive polymer support 24 is coupled with a circuit 26 which includes a one or more LEDs 28 and the combined support, 24, frame 22, circuit 26, and one or more LEDs 28 may be called a base in particular implementations. As illustrated, the LED light assembly 20 also includes a non-thermally conductive polymer lens cover 30 that is coupled to the thermally conductive polymer support 24 via the frame 22. In addition, as illustrated in FIG. 2A, particular implementations of LED light assemblies 20 may include mating features 32 on the frame 22 and corresponding mating features 34 on the non-thermally conductive polymer lens cover 30 that may aid with coupling the two pieces together using a particular welding process, such as linear vibration welding. The frame 22 and the non-thermally conductive polymer lens cover 30 may be, in particular implementations, coupled using any of the previously discussed thermal welding techniques described in this document.

Figure 2B:
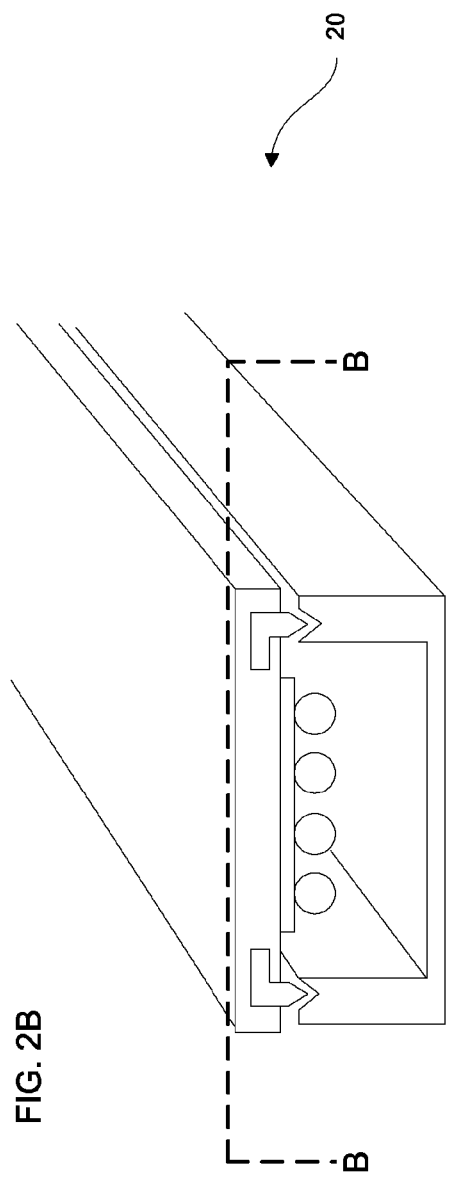
FIG. 2B is a perspective view of the implementation of an LED light assembly illustrated in FIG. 2A showing the location of the cross section illustrated in FIG. 2A along sectional line B.

When the non-thermally conductive polymer lens cover 30 is coupled to the thermally conductive polymer support 24 over the one or more LEDs 28, an enclosure 36 is formed. In particular implementations of LED light assemblies 20, the enclosure 36 may exhibit the properties of a hermetic enclosure like those previously described in this document. Like the other implementations of LED light assemblies 2 described in this document, the thermally conductive polymer support 24 may serve as a heat sink during operation of the one or more LEDs 28 and may be coupled with a vehicle surface or object surface which further serves as an additional heat sink. Referring to FIG. 2B, a perspective view of the implementation of an LED light assembly 20 illustrated in FIG. 2A is illustrated, showing the location of the cross section along Sectional line B. Implementations of LED light assemblies 20 may also be formed and/or utilized as light bars or other lighting fixtures for use in vehicles and objects as discussed previously in this document. As was previously discussed, because the non-thermally conductive polymer lens cover 30 is coupled to the frame 22 which includes a non-thermally conductive polymer member, welding can be used to form the joint and mechanical stresses induced through heating of the joint may be substantially eliminated because the frame 22 and lens cover 30 may be constructed of relatively similar materials.

Implementations of LED light assemblies 2 like those illustrated in FIGS. 1A and 1B may be assembled using implementations of a first method of assembling an LED light assembly 38. Referring to FIG. 3A, as illustrated, the method 38 may include providing a thermally conductive polymer support coupled with a circuit that includes a one or more LEDs (step 42) and overmolding a non-thermally conductive polymer member over a flange extending along a perimeter of the thermally conductive polymer support (step 44). The method 38 may further include enclosing the one or more LEDs by welding a non-thermally conductive polymer lens cover to the non-thermally conductive polymer member (step 46). Overmolding may be accomplished by any of a wide variety of techniques, including insert molding, multiple material molding, two-shot molding, and any other overmolding technique.

Referring to FIG. 3B, implementations of LED light assemblies 20 like those illustrated in FIGS. 2A and 2B may be assembled using implementations of a second method of assembling an LED light assembly 40. As illustrated, the method 40 may include providing a frame including a non-thermally conductive polymer member (step 48); overmolding a thermally conductive polymer support over the frame, the thermally conductive polymer support being coupled with a circuit including a one or more LEDs (step 50); and enclosing the one or more LEDs by welding a non-thermally conductive polymer lens cover to the frame (step 52). The overmolding used in particular implementations of the method may be any previously discussed in this document.

In places where the description above refers to particular implementations of LED light assemblies, it should be readily apparent that a number of modifications may be made without departing from the spirit thereof and that these implementations may be applied to other LED light assemblies.

The invention claimed is:

1. An LED light assembly comprising:
    a base comprising:
        a circuit comprising one or more LEDs;
        a thermally conductive polymer support coupled to the circuit; and
        a non-thermally conductive polymer member coupled to the thermally conductive polymer support; and
    a non-thermally conductive polymer lens cover coupled to the non-thermally conductive polymer member;
    wherein the non-thermally conductive polymer lens cover is configured to enclose the circuit of the base when coupled to the non-thermally conductive polymer member.

2. The assembly of claim 1, wherein the non-thermally conductive polymer member is overmolded over a flange extending from a perimeter of the thermally conductive polymer support.

3. The assembly of claim 1, wherein the thermally conductive polymer support is overmolded over a frame formed of the non-thermally conductive polymer member.

4. The assembly of claim 3, wherein the frame comprises one or more mating features corresponding to one or more mating features included in the non-thermally conductive polymer lens cover.

5. The assembly of claim 1, wherein the non-thermally conductive polymer member and the non-thermally conductive polymer lens cover are joined by one of linear vibration welding, sonic welding, acoustic welding, and thermal welding.

6. The assembly of claim 1, wherein the thermally conductive polymer support has a bulk thermal conductivity about five times higher than a bulk thermal conductivity of the non-thermally conductive polymer member.

7. The assembly of claim 1, wherein a bulk thermal conductivity of the non-thermally conductive polymer member is about 0.2 watt/mK or lower and a bulk thermal conductivity of the thermally conductive polymer support is about 1 watt/mK or higher.

8. The assembly of claim 1, wherein when the non-thermally conductive polymer lens cover is coupled over the base, the circuit is hermetically sealed within an enclosure.

9. A method of forming an LED light assembly, the method comprising:
   providing a thermally conductive polymer support coupled with a circuit comprising a one or more LEDs;
   overmolding a non-thermally conductive polymer member over a flange extending along a perimeter of the thermally conductive polymer support; and
   enclosing the one or more LEDs by welding a non-thermally conductive polymer lens cover to the non-thermally conductive polymer member.

10. The method of claim 9, wherein enclosing the one or more LEDs by welding the non-thermally conductive polymer lens cover forms a hermetically sealed enclosure around the one or more LEDs.

11. The method of claim 9, wherein enclosing the one or more LEDs by welding the non-thermally conductive polymer lens cover further comprises using one of linear vibration welding, sonic welding, acoustic welding, and thermal welding.

12. The method of claim 9, wherein overmolding the non-thermally conductive polymer member over the flange comprises overmolding with a thermally conductive polymer support having a bulk thermal conductivity about five times higher than a bulk thermal conductivity of the non-thermally conductive polymer member.

13. The method of claim 9, wherein overmolding the non-thermally conductive polymer member over the flange comprises overmolding a non-thermally conductive polymer member having a bulk thermal conductivity of about 0.2 watt/mK or lower over the flange of a thermally conductive polymer support having a bulk thermal conductivity of about 1 watt/mK or higher.

14. A method of forming an LED light assembly, the method comprising:
   providing a frame comprising a non-thermally conductive polymer member;
   overmolding a thermally conductive polymer support over the frame, the thermally conductive polymer support coupled with a circuit comprising a one or more LEDs; and
   enclosing the one or more LEDs by welding a non-thermally conductive polymer lens cover to the frame.

15. The method of claim 14, wherein enclosing the one or more LEDs by welding the non-thermally conductive polymer lens cover forms a hermetic seal around the one or more LEDs.

16. The method of claim 14, wherein enclosing the one or more LEDs by welding the non-thermally conductive polymer lens cover further comprises using one of linear vibration welding, sonic welding, acoustic welding, and thermal welding.

17. The method of claim 14, wherein enclosing the one or more LEDs by welding the non-thermally conductive polymer lens cover comprises welding one or more mating features included on the frame to one or more mating features included on the non-thermally conductive polymer lens cover.

18. The method of claim 14, wherein overmolding the thermally conductive polymer support over the frame comprises overmolding with a thermally conductive polymer support having a bulk thermal conductivity about five times higher than a bulk thermal conductivity of the non-thermally conductive polymer member.

19. The method of claim 14, wherein overmolding the thermally conductive polymer support over the frame comprises overmolding a thermally conductive polymer member having a bulk thermal conductivity of about 1 watt/mK or higher over a non-thermally conductive polymer member having a bulk thermal conductivity of about 0.2 watt/mK or lower.

* * * * *